US006609089B1

(12) United States Patent
Ball et al.

(10) Patent No.: US 6,609,089 B1
(45) Date of Patent: Aug. 19, 2003

(54) METHOD AND APPARATUS FOR PROVIDING INTERACTIVE SERVICES WITH MULTIPLE INTERFACES

(75) Inventors: Thomas J. Ball, Mercer Island, WA (US); Peter John Danielsen, Naperville, IL (US); Lalita Jategaonkar Jagadeesan, Naperville, IL (US); Konstantin Laufer, Chicago, IL (US); Peter Andrew Mataga, Naperville, IL (US); Kenneth G. Rehor, Berwyn, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/386,093

(22) Filed: Aug. 30, 1999

(51) Int. Cl.$^7$ .......................... G06F 17/27; H04M 1/66

(52) U.S. Cl. .............................................. 704/9; 379/67

(58) Field of Search .......................... 704/9, 1, 10, 270, 704/275; 379/67, 88

(56) References Cited

U.S. PATENT DOCUMENTS

| | | | | |
|---|---|---|---|---|
| 4,688,195 A | * | 8/1987 | Thompson et al. ............. | 704/9 |
| 5,600,765 A | * | 2/1997 | Ando et al. .................. | 395/133 |
| 5,677,993 A | * | 10/1997 | Ohga et al. .................. | 705/275 |
| 5,748,974 A | * | 5/1998 | Johnson ........................ | 704/9 |
| 5,799,063 A | | 8/1998 | Krane | |
| 5,805,775 A | * | 9/1998 | Eberman et al. ............. | 395/133 |
| 5,884,249 A | * | 3/1999 | Namba et al. .................. | 704/9 |
| 5,884,262 A | | 3/1999 | Wise et al. | |

* cited by examiner

Primary Examiner—Patrick N. Edouard

(57) ABSTRACT

Interactive services with multiple interfaces are realized by employing a modular approach to their implementation. Such an approach facilitates supporting natural language understanding interaction with users through use of interfaces that at least allow the user to provide information beyond what is currently being requested by the service, and/or different ordering of inputs, and/or incomplete information, and/or correction of information, and/or the return of control to prior points in the service. This is realized, in an embodiment of the invention, by employing an interactive service logic that uses "reactive constraint graphs", i.e., a form of event-driven graph in which nodes contain constraints on events, in conjunction with a service monitor. The service monitor manages the communication between the service logic and the multiple user interfaces. As such it provides a communication mechanism in the form of a so-called "look ahead" in which the user can input information beyond what is currently required by the interactive service. Specifically, in each round of user interaction, reactive constraint graphs report to the service monitor the set of events that are currently enabled. These enabled events correspond to the information the interactive service is currently requesting (or ready to accept) from a user. The user interfaces collect information (perhaps beyond this set) from the user and send it to the service monitor. The service monitor then matches the received information against the information requested by the service logic, and sends the information one event at a time to the service logic, in a priority order specified by the service provider. After each event is sent to the service logic from the service monitor, the service logic reports its new set of enabled events back to the service monitor. In turn, the service monitor sends another event that matches the enabled events to the service logic. The service monitor then notifies the user interfaces to send a new collection, i.e., set, of information from the individual users only when no current information matches the enabled events. This approach advantageously allows a user to input information beyond what is currently needed by the interactive service.

36 Claims, 4 Drawing Sheets

FIG. 5

INITIAL STATE OF SERVICE

SERVICE LOGIC: SENDS TO SERVICE MONITOR SET OF ENABLED EVENTS.
prompt_req events: {login, pin}

SERVICE MONITOR: SENDS SET OF ENABLED EVENTS TO USER INTERFACES

USER INTERFACES: PROMPT THE USER WITH "WELCOME TO THE ANY-TIME TELLER BANKING SERVICE. PLEASE SPECIFY YOUR LOGIN AND PERSONAL IDENTIFICATION NUMBER".

USER: STATES "I WANT TO TRANSFER MONEY FROM MY CHECKING ACCOUNT. MY LOGIN IS JohnDoe AND MY PIN IS 4341"

USER INTERFACES: SEND TO SERVICE MONITOR THE SET OF USER EVENTS: {startTransfer, src(checking), login(JohnDoe), pin(4341)}

MATCHING EVENTS: {login, pin}

SERVICE MONITOR: SENDS login(JohnDoe) EVENT TO SERVICE LOGIC

SERVICE LOGIC: SENDS TO SERVICE MONITOR SET OF ENABLED EVENTS.
prompt_req events: {pin}, prompt_opt events: {login}

REMAINING USER EVENTS: {startTransfer, src(checking), pin(4341)}

MATCHING EVENTS: {pin}

SERVICE MONITOR: SEND pin(4341) EVENT TO SERVICE LOGIC

SERVICE LOGIC: SENDS TO SERVICE MONITOR SET OF ENABLED EVENTS.
prompt_choice events: {startDeposit, startWithdrawal, startTransfer, userQuit}

REMAINING USER EVENTS: {startTransfer, src(checking)}

MATCHING EVENTS: {startTransfer}

SERVICE MONITOR: SENDS START TRANSFER EVENT TO SERVICE LOGIC

SERVICE LOGIC: SENDS TO SERVICE MONITOR SET OF ENABLED EVENTS.
prompt_req events: {src, tgt, amt}

REMAINING USER EVENTS: {src(checking)}

MATCHING EVENTS: {src}

SERVICE MONITOR: SENDS src(checking) EVENT TO SERVICE LOGIC

SERVICE LOGIC: SENDS TO SERVICE MONITOR SET OF ENABLED EVENTS.
prompt_req events: {tgt, amt}, prompt_opt events: {src}

SERVICE MONITOR: SENDS SET OF ENABLED EVENTS TO USER INTERFACES

USER INTERFACES: PROMPT THE USER WITH "HELLO JohnDoe. PLEASE SPECIFY THE TARGET ACCOUNT AND THE AMOUNT YOU WOULD LIKE TO TRANSFER".

METHOD AND APPARATUS FOR PROVIDING INTERACTIVE SERVICES WITH MULTIPLE INTERFACES

RELATED APPLICATION

U.S. patent application Ser. No. 09/386,094 was filed concurrently herewith.

TECHNICAL FIELD

This invention relates to providing interactive services and, more particularly, to interactive services with multiple interfaces.

BACKGROUND OF THE INVENTION

Prior arrangements for implementing interactive services with multiple interfaces employed finite-state machines (FSM) to realize the necessary service logic. This was achieved either explicitly, using FSM tools such as ObjecTime or StateCharts, or implicitly, using programming languages/technologies such as C, C++, Perl or Microsoft Active Server Pages (ASP).

In order to support natural language understanding interaction with users, services with multiple flexible interfaces need to allow the user to provide information beyond what is currently being requested by the service, different ordering of inputs, incomplete information, correction of information and the return of control to previous points in the service. Finite-state machine based approaches, however, cannot support these desired aspects in a modular fashion. Indeed, every possible ordering of inputs needs to be explicitly specified, resulting in an exponentially increasing number of states and transitions in the FSM. Additionally, including the other desirable aspects noted above further increases the size and complexity of the FSM. Moreover, it is extremely difficult to modify the FSM; for example, the number of modifications required to the FSM to add another input can be exponential in the size of the input set.

User interaction with the prior interactive services is in so-called rounds. During each round the user must provide exactly the information requested by the service in its then current state. Specifically, in a graphical interface, the user must click on buttons corresponding to input choices; in a web-based interface, the user must click on buttons or fill in text fields; in a touch-tone telephone interface, the user must press buttons of the key pad; and in an automatic speech recognition based interface, the user must utter exactly the information that the service requires in its current state. Such arrangements are very restrictive in requiring the exactly needed information.

Prior arrangements employed to provide spoken dialog interaction are focused on a single, spoken language interface, which is limiting.

SUMMARY OF THE INVENTION

Problems and limitations of prior known arrangements for providing interactive services are overcome by employing a modular approach to implementing interactive services with a plurality, i.e., multiple, user interfaces. Such an approach facilitates supporting natural language understanding interaction with users through use of user interfaces that at least allow the user to provide information beyond what is currently being requested by the service, and/or different ordering of inputs from the user interfaces, and/or incomplete information from the user interfaces, and/or correction of information from the user interfaces, and/or the return of control to prior points in the service in response to a request from at least one of the plurality of user interfaces.

This is realized, in an embodiment of the invention, by employing an interactive service logic that uses "reactive constraint graphs", i.e., a form of event-driven graph in which nodes contain constraints on events, in conjunction with a service monitor. The service monitor manages the communication between the service logic and the multiple user interfaces. As such it provides a communication mechanism in the form of a so-called "look ahead" in which the user can input information beyond what is currently required by the interactive service.

Specifically, in each round of user interaction, reactive constraint graphs report to the service monitor the set of events that are currently enabled. These enabled events correspond to the information the interactive service is currently requesting (or ready to accept) from a user. The user interfaces collect information (perhaps beyond this set) from the user and send it to the service monitor. The service monitor then matches the received information against the information requested by the service logic, and sends the information one event at a time to the service logic, in a priority order specified by the service provider. After each event is sent to the service logic from the service monitor, the service logic reports its new set of enabled events back to the service monitor. In turn, the service monitor sends another event that matches the enabled events to the service logic. The service monitor then notifies the user interfaces to send a new collection, i.e., set, of information from the individual users only when no current information matches the enabled events. This approach advantageously allows a user to input information beyond what is currently needed by the interactive service.

BRIEF DESCRIPTION OF THE DRAWING

FIG. 5 illustrates the steps performed in an example execution of the AnyTime Teller including look ahead in accordance with the invention.

DETAILED DESCRIPTION

Figure 1:
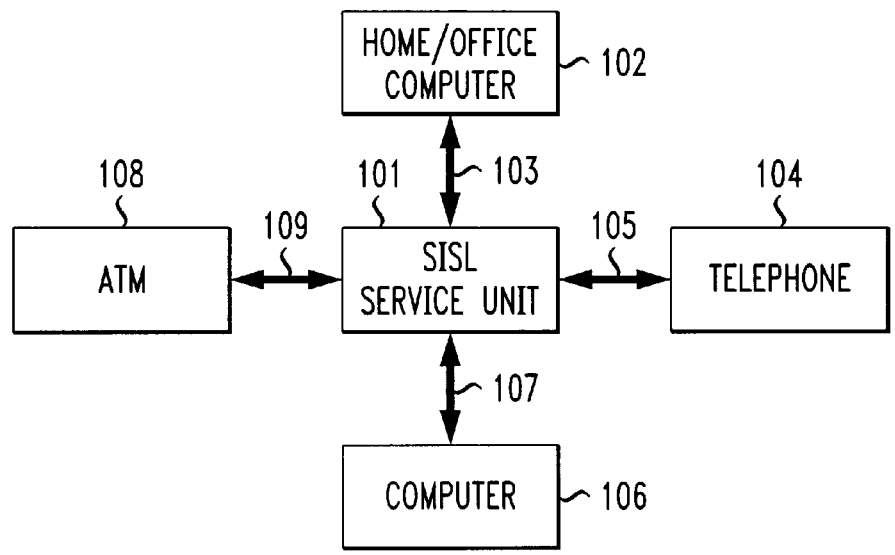
FIG. 1 shows, in simplified block diagram form, details of an interactive system in which the invention may be advantageously employed.

FIG. 1 shows, in simplified block diagram form, details of an interactive system in which the invention may be advantageously employed. It should be noted that the arrangement shown in FIG. 1 is but one example of an application of the invention. Indeed, a plurality of different user interfaces and/or one more identical user interfaces may be employed as desired.

Specifically, shown in FIG. 1 is SISL (Several Interfaces, Single Logic) service unit 101; home/office computer 102 used as a customer and/or provider interface and includes automatic speech recognition including natural language understanding, if desired, that is interfaced to SISL service unit 101 via an Internet link 103; telephone 104 also used as a customer and/or provider interface that is interfaced to SISL service unit 101 via a telephone network 105 including, for example, touch-tone, i.e., multi-frequency, signaling; computer 106 used as a customer and/or provider interface, which may also include a natural language understanding, that is interfaced to SISL service unit 101 via a local area network (LAN); and ATM (automatic teller machine) used as a customer interface and, typically, is interfaced to SISL service unit 101 via a direct connect 109. A key advantage of SISL is that all user interfaces to a service share the same service logic. SISL provides a clean separation between the service logic and the software for a variety of user interfaces including but not limited to Java applets, HTML pages, speech-based natural language dialog, and telephone-based voice access. In this example, SISL is implemented using the JAVA programming language.

At the outset it is felt best to describe some of the principles employed in implementing the flexible interactive service including an embodiment of the invention. For simplicity and clarity of exposition, these principles will be presented in the context of a so-called Any-Time Teller banking service employing the invention. The Any-Time Teller is an interactive banking service. The service is login protected; customers must authenticate themselves by entering an identifier (login) and PIN, i.e., personal identification number, (password) to access the functions. As customers may have many money accounts, most functions require the customer to select the account(s) involved.

Once authenticated, the customer may:
Make a deposit.
Make a withdrawal. The service makes sure the customer has enough money in the account, then withdraws the specified amount.
Transfer funds between accounts. The service prompts the customer to select a source and target account, and a transfer amount, and performs the transfer if (1) the customer has enough money in the source account, and (2) transfers are permitted between the two accounts.
Get the balance of an account. Display the balance with respect to all posted transactions.
View the transactions of an account. Display the transactions for the selected account.
See the last transaction. Display the last action the customer performed.

The transfer capability of the Any-Time Teller requires the collection of three events: the source account (src), target account (tgt), and dollar amount (amt). There are five constraints that those input events must meet before a transfer can take place:
c1: src must be a valid account
c2: tgt must be a valid account
c3: amt must be greater than zero
c4: amt must be less than or equal to the balance of src
c5: the bank must allow transfers from src to tgt
The service should check whether or not a constraint is violated as soon as possible; hence, it must be prepared to react when only a subset of the three events is present. The service must then prompt for the remaining events.

Some basic principles are now considered related to the design and implementation of interactive services with multiple and varied user interfaces. These principles are especially important in the presence of multiple interfaces including those based on spoken natural language.

Lesser Order=Greater Freedom
The source account, target account, and dollar amount of the transfer capability should be independent events that can be collected in any order, where all three events are necessary to perform a transfer. By making explicit independent and dependent events, it in clear what events may be reordered without affecting the behavior of the service. This points the way to our first principle of the service specification:
Principle 1: Specify the service logic as a set of constraints on events and introduce a constraint between two events only when absolutely necessary for the correct functioning of a service. That is, the service logic should be able to accept independent input events in different orders.

Eliminate Errors Only
It is often desirable for a service to respond as soon as possible with error conditions about user input. Since a constraint on the input events may refer to any arbitrary subset of those events, it is desirable that the service logic should be able to accept arbitrary subsets of events at any time.
Principle 2: The service logic should accept an incomplete input, i.e., subsets of the universe of possible events.

I take that back!
Unfortunately, humans often change their mind and/or make mistakes. Whenever possible, services must accommodate these shortcomings of our species, providing a capability to correct information or back out of a transaction. This leads to our third principle:
Principle 3: The service logic should allow the user to back up to correct or update previously submitted information at any time.

A closely related principle is:
Principle 4: The service logic should allow the user to back up to previous points in the service.

Ready or not?
Services that obey the above principles generalize from linear user interactions to potentially allow multiple points of interaction to be enabled at a given instant. This information serves as an abstraction of the current control point of the service, and can be handled in a different manner by different user interfaces. For example, in automatic speech recognition interfaces, the information about currently enabled events is used by the user interface in two ways:
to appropriately prompt the user for information, thus compensating for the lack of visual cues; and
to effectively parse the information provided by the user.

A user interface need not respond to all currently enabled events of the service. Thus, different user interfaces can formulate different queries to the user even though the control point in the underlying service logic, as revealed by the current set of enabled events, is the same. The decoupling that we are seeking between the user interface and the service logic, therefore points the way to our last principle of the service specification:
Principle 5: At any point in the service, the service logic must automatically report to the user interfaces all currently enabled events, user prompts, help, and ways to revert back to previous points in the service.

User interfaces have two main responsibilities with respect to the SISL architecture that reflect the two-way information flow between the user interface and service logic:
Based on the events received from the service logic, via the service monitor, prompt the user to provide the appropriate information and respond if the user requests help.
Collect the information from the user and transform the information into events to be sent to the service logic, via the service monitor.

Indeed, any user interface (UI) that performs these functions can be employed in conjunction with an SISL service logic. Additionally, SISL provides a convenient framework for designing and implementing web-based, applet-based, automatic speech recognition-based and telephone voice-based interfaces. To implement such user interfaces, the UI designer need only specify two functions corresponding to the prompt and help mechanism. For automatic speech recognition interfaces, a set of speech grammars, i.e., the input to a speech recognition engine that permits it to efficiently and effectively recognize spoken input, together with a third function that specifies which grammars to enable is also required.

The required functions are:

A prompt function that generates the string to be given as the prompt to the user. The SISL infrastructure automatically causes automatic speech recognition-based interfaces to speak the prompt string. Web-based interfaces automatically display the prompt string, as well as, radio buttons corresponding to the possible transaction choices. For the other prompt events, text fields are automatically displayed, while submit buttons are automatically displayed for enabled events that allow the user to return to earlier points in the service.

A help function that generates the string to be given as the prompt to the user.

A grammar function that enables the correct set of grammar rules; this function is only needed for automatic speech recognition-based interfaces.

From prescribed functions and grammars, the SISL infrastructure automatically coordinates the collection and event transformation mechanisms, and integrates the user interface with the service logic and the service monitor. For automatic speech recognition-based interfaces, the SISL infrastructure automatically generates a desktop interface based on JAVA Speech API. To enable telephone-based voice access to the service, SISL automatically generates VoxML pages, which specify the voice dialog to be carried out on a telephony platform. For Web-based interfaces, the SISL infrastructure automatically generates HTML (Hypertext Markup Language) pages. It is noted that SISL provides a mechanism for the UI designer to customize the look and feel of the interface.

Figure 2:
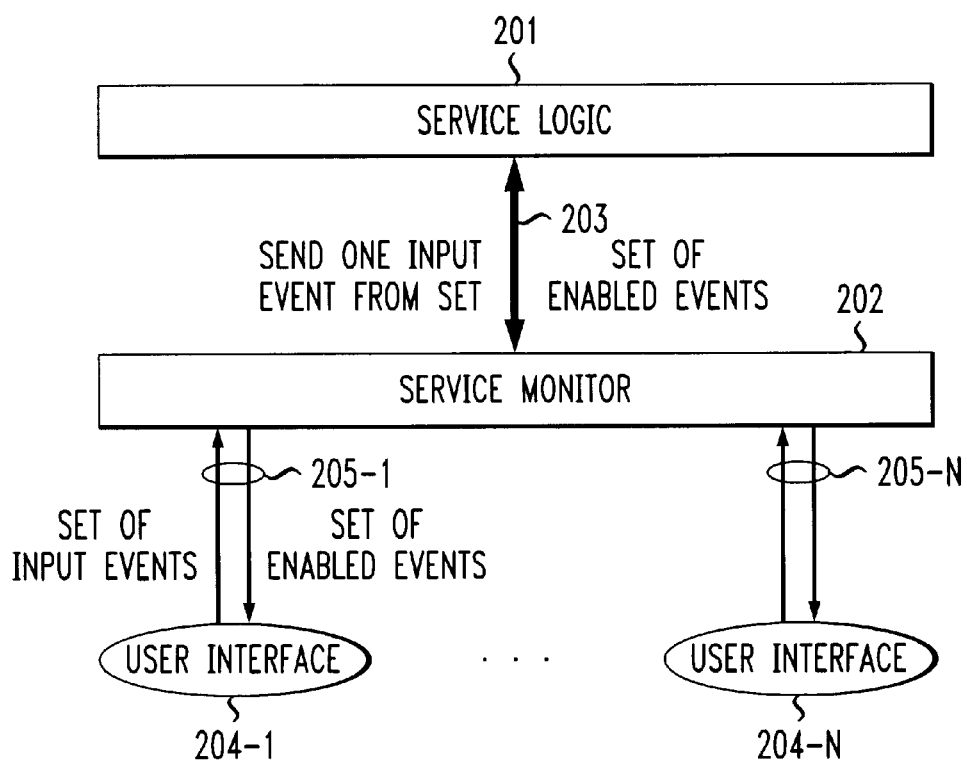
FIG. 2 shows, in simplified block form, details of the SISL (Several Interfaces, Single Logic) architecture employed in the embodiment of FIG. 1.

FIG. 2 shows, in simplified block form, details of the SISL (Several Interfaces, Single Logic) architecture employed in the embodiment of FIG. 1. The SISL architecture together with the event communication protocol provides modularity between the service logic 201 and user interfaces 204. In particular, two features of the event communication protocol allow service logic 201 to function completely without knowledge of the specifics of the individual user interfaces 204. These features are: (1) events are multicast from service logic 201 via service monitor 202 to user interfaces 204 and, consequently, service logic 201 does not need to know the destinations of these events; and (2) the source of the events from the user interfaces 204 is not recorded and, consequently, the service logic 201 does not know which one or more of user interfaces 204 sent the events. Service monitor 202 is responsible for maintaining this communication protocol. This modularity allows service providers to provide interchangeable user interfaces 204, or add new ones, to a single consistent source of service logic and data.

Specifically, shown in FIG. 2 are service logic unit 201, service monitor unit 202 and user interfaces 204-1 through 204-N. The key principle underlying SISL is that all user interfaces 204 to a service share a single service logic 201. All communications between the service logic 201 and its multiple user interfaces 204 are through events, via a service monitor 202. Events from the service logic 201 are broadcast to the user interfaces 204 via 203 to the service monitor 202 and, then, via 205 as a set of enabled events to the user interfaces 204. At the outset of the service, for example the Any-Time Teller banking service, each user interface 204 registers with the service monitor 202 to indicate which events it is interested in receiving. After collecting information from the user, the user interfaces 204 send events to the service monitor 202 via bi-directional links 205; the service monitor 202 does not record the source of these events. The service monitor 202 passes the events, one at a time, via 203 to the service logic 201.

Event communication supports decoupling of the service logic 201 and the user interfaces 204, and allows service providers to provide interchangeable user interfaces 204, or add new ones, to a single consistent source of service logic 201 and data.

In each round of interaction, the SISL infrastructure automatically sends out a set of events via 203 from the service logic 201 to the service monitor 202, corresponding to the events that are currently enabled in the service logic 201. There are three kinds of events: prompt events, up events, and notify events. Prompt events indicate to the user interface what information to communicate to the user and what information the service is ready to accept. There are three kinds of prompt events:

prompt_choice events are disjunctive choices currently enabled in the service logic 201. For example, after the user has successfully logged into the Any-Time Teller banking service, a choice among the different transaction types is enabled. The service logic 201 sends a prompt_choice_deposit, prompt_choice_withdrawal event, and a prompt_choice_transfer event, and so forth, via 203 to the service monitor 202.

prompt_req events are the events currently required by the service logic 201. For example, suppose the user has chosen to perform a transfer transaction. The Any-Time Teller requires that the user input a source account, a transfer account, and amount, and hence sends prompt_req_src, prompt_req_tgt, and prompt_req_amt via 203 to the service monitor 202.

prompt_opt events are events enabled in the service logic 201, for which the user may correct previously given information. For example, suppose the user is performing a transfer and has already provided his/her source and target accounts, but not the amount. The service logic 201 sends prompt_opt_src, prompt_opt_tgt, and prompt_req_amt events via 203 to the service monitor 202. This indicates that the user may override the previously given source and target accounts with new information.

Up events correspond to prior points in the service logic 201 to which the user may go back. For example, the service logic 201 sends an up_MainMenu event via 203 to the service monitor 202. This allows the user to abort any transaction and go back up to the main menu.

Notify events are simply notifications that the user interface 204 should give the user; for example, that a transaction has completed successfully or that information provided by the user was incorrect or inconsistent.

Thus, the service monitor 202 is essentially a controllable interface that manages the communication between the service logic 201 and the multiple user interfaces 204. As such, service monitor 202 provides a communication mechanism in the form of a so-called "look ahead" in which the user can input information beyond what is currently required by the interactive service. The so-called look ahead is realized because the user interfaces 204 can supply information to service monitor 202 that is beyond, i.e., in addition, to that which is currently being requested by service logic 201. Thus, service monitor 202 may already have information from user interfaces 204 that may be later requested by, but is not currently being requested by, service logic 201. Note that service monitor 202 does not request any further information from user interfaces 204 until it does not have any information, i.e., input event, that matches an enabled event from service logic 201.

In summary, service monitor 202 is essentially a controllable memory unit including a bidirectional communication link 203 to service logic 201 and bidirectional communication links 205 to user interfaces 204. Service monitor 202 at any current instant stores a current set of user events from user interfaces 204, old user events not yet sent to service logic 201 and a current set of enabled events from service logic 201.

Figure 3:
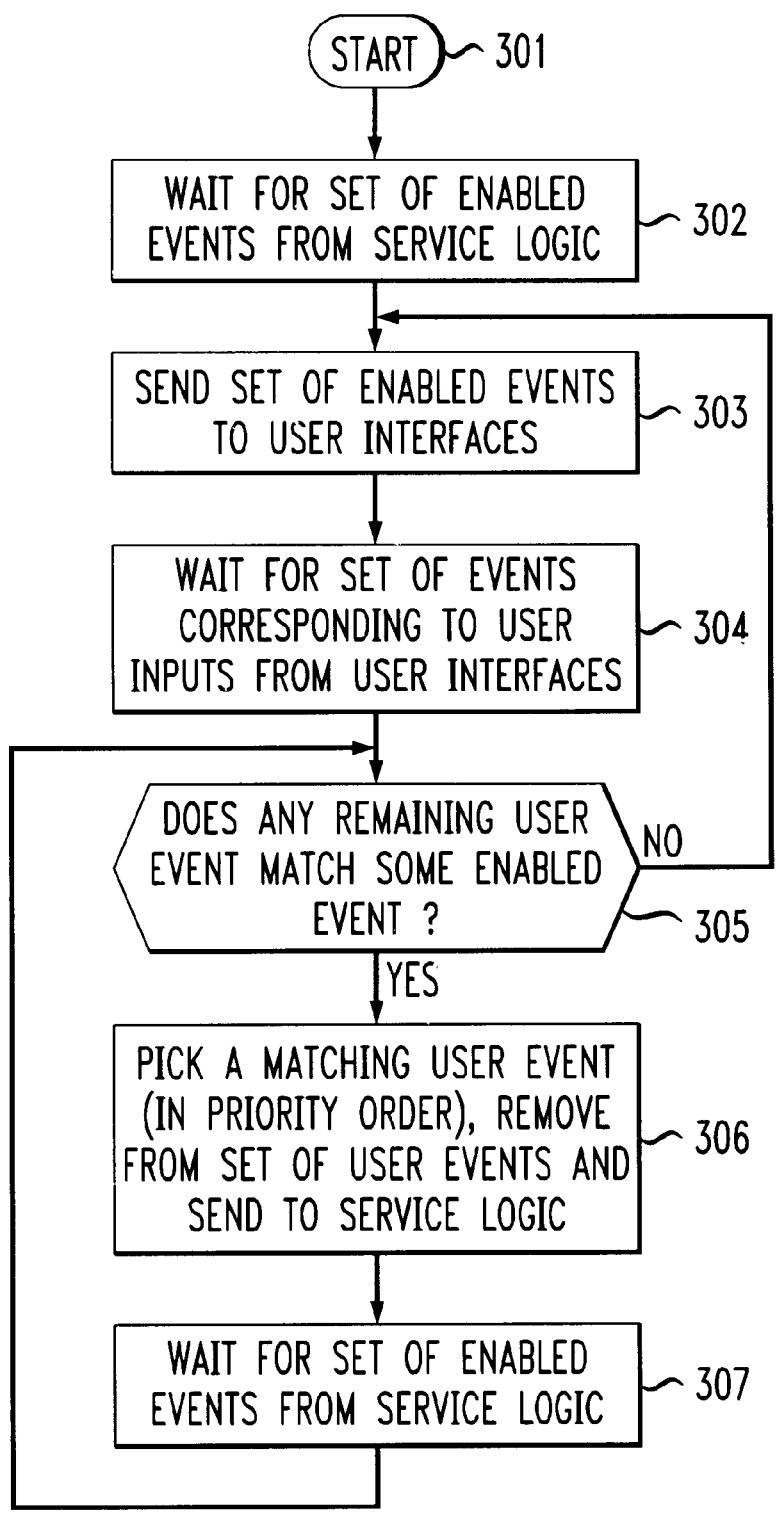
FIG. 3 is a flow chart illustrating the steps implemented by the service monitor in accordance with the invention.

FIG. 3 is a flowchart illustrating the steps in implementing the operation of service monitor 202 in accordance with the invention. Accordingly, the process is started in step 301. Then, step 302 causes monitor 202 (FIG. 2) to wait for a set of enabled events from service logic 201. Step the causes a set of enabled events to be sent from service monitor 202 to user interfaces 204. Service monitor 202 is caused by step 304 to wait for a set of events corresponding to user inputs from user interfaces 204. Then, step 305 tests to determine whether any remaining user event matches some enabled event. If the test result in step 305 is NO, control is returned to step 303 and steps 303 through 305 are iterated until step 305 yields a YES result. Upon step 305 yielding a YES result, step 306 causes a matching user event to be selected in priority order, the removal of the selected matching user event from the set of user events, and sending the selected user event to service logic 201. Then, step 307 causes service monitor 202 to wait for a set of enabled events from service logic 201. Thereafter, control is returned to step 305 and, then, appropriate ones of steps 303 through 307 are iterated.

Figure 4:
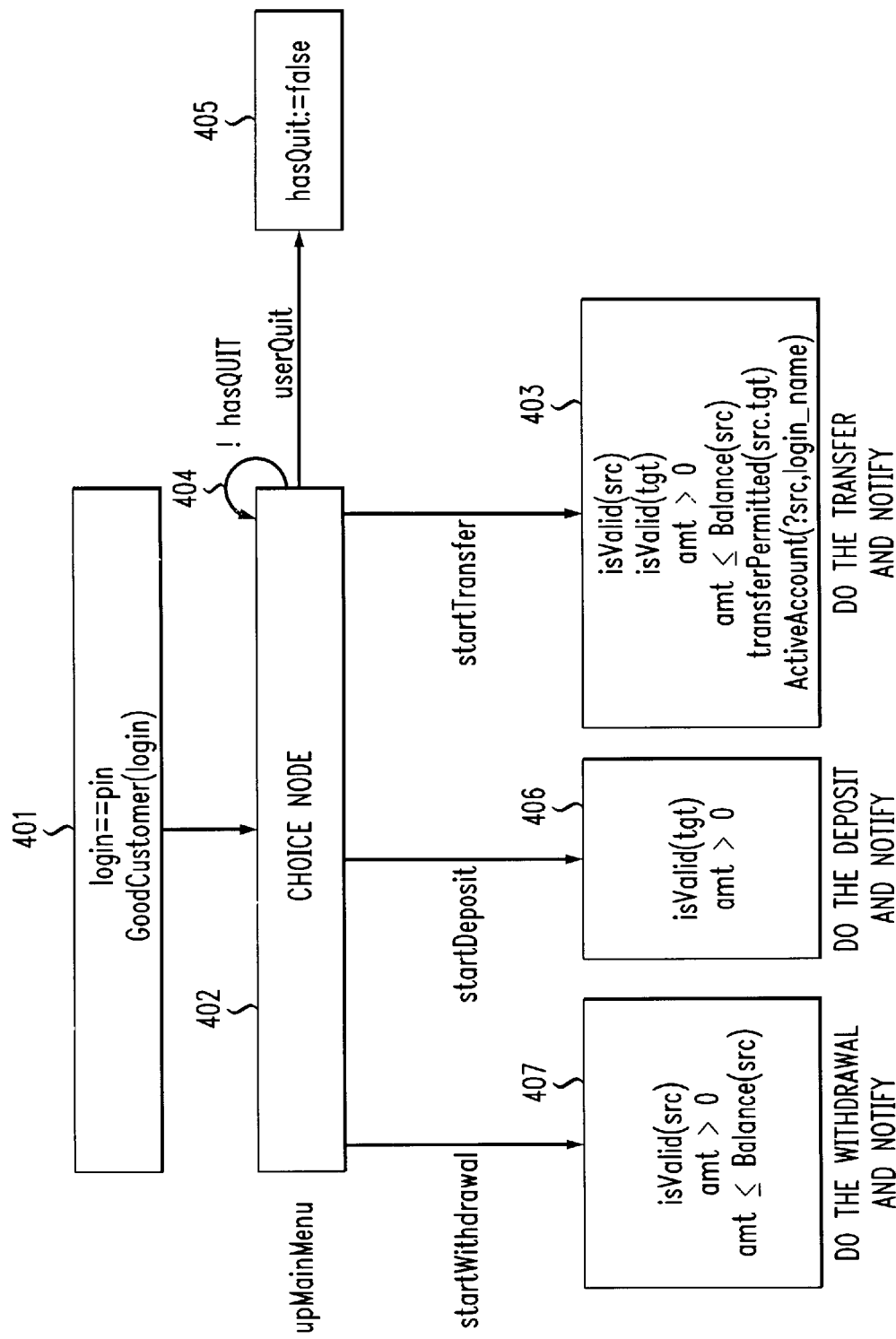
FIG. 4 is a flow diagram illustrating a reactive constraint graph for a portion of an Any-Time Teller banking service example.

FIG. 4 is a flow diagram illustrating a reactive constraint graph for a portion of the Any-Time Teller banking service example.

In SISL, the service logic 201 (FIG. 2) of an application is specified as a reactive constraint graph, which is a directed acyclic graph with an enriched structure on the nodes. The traversal of reactive constraint graphs is driven by the reception of events from the environment; these events have an associated label, i.e., the event name, and may carry associated data. In response, the graph traverses its nodes and executes actions; the reaction of the graph ends when it needs to wait for the next event to be sent by the environment. For example, FIG. 4 shows a SISL reactive constraint graph that implements part of the functionality of the Any-Time Teller.

Reactive constraint graphs can have three kinds of nodes, namely, choice nodes, constraint nodes and action nodes.

Choice nodes represent a disjunction of information to be received from the user. Every choice node has a specified set of events. There are two forms of choice nodes, namely, event-based and data-based. Every event-based choice node has a specified set of events. For every event in this set, the SISL infrastructure automatically sends out a corresponding prompt_choice event from the service logic 201 to the user interface, via the service monitor 202. The choice node waits for the user interface to send, via the service monitor 202, any event in the specified set. When such an event arrives, the corresponding transition is taken, and control transfers to the descendent, i.e., child, node.

For example, if a startTransfer event arrives when control is at the choice node, the corresponding transition is taken and control is transferred to the target constraint node. To ensure determinism, all outgoing transitions of a choice node must be labeled with distinct event names.

Every data-based choice node has a specified set of preconditions on data. To ensure determinism, these preconditions must be specified so that exactly one of them is "true" in any state of the system. When control reaches a data-based choice node, the transition associated with the unique "true" precondition is taken, and control is transferred to the child node.

Constraint nodes represent a conjunction of information to be received from the user. Every constraint node has an associated set of constraints on events. Constraints have the following components:

The signature is the set of events occurring in the constraint.

The evaluation function is a boolean function on the events in the signature.

The optional satisfaction tuple consists of an optional action, not involving user interaction, and an optional notify function that may return a notify event with an associated message. If the constraint evaluates to true, the action is executed, the notify function is executed and the returned notify event is sent to the user interface via the service monitor 202.

The optional violation tuple consists of an optional action, not involving user interaction, an optional notify function that may return a notify event with an associated message, an optional uplabel function that may return the uplabel of an ancestor node and an optional child node. If the constraint evaluates to "false", the action is executed, the notify function is executed and the returned notify event is sent to the user interfaces 204via the service monitor 202. The uplabel function is also executed; if it returns an ancestor's uplabel, it is generated, and hence control reverts back to the ancestor node. If no ancestor node's uplabel is returned and a child node is specified, control is transferred to the specified child node.

For example, amt<=Balance (src) of 407 in FIG. 4 is equivalent to ?amt<=Balance(?src), and is the evaluation of a prescribed constraint. The signature of this constraint is the set {amt, src}, and the satisfaction notify function and violation notify function, respectively, report to the user whether or not the source account has enough funds to cover the requested amount. The notification ?EventName refers to the data on the event with name EventName.

Every constraint node has the following components:

An associated set of constraints. In the current semantics and implementation, this set is totally ordered, specifying the priority order in which the constraints are evaluated.

An optional entry action, not involving user interaction.

An optional finished tuple, consisting of an optional exit action, not involving user action, an optional notify function, an optional uplabel function and an optional child node.

The SISL infrastructure automatically sends out a prompt_req event, from the service logic 201 (FIG. 2) to the user interfaces 204via the service monitor 202, for every event that is still needed in order to evaluate some constraint. Additionally, the constraint node sends out a prompt_opt event for all other events mentioned in the constraints. These correspond to the information that can be corrected by the user.

In every round of interaction, the constraint node waits for the user interface to send, via the service monitor 202, any event that is mentioned in the signature of its associated constraints. Each constraint associated with a constraint node is evaluated as soon as all of its events have arrived. If an event is resent by the user interfaces, i.e., information is corrected, all constraints with that event in their signature are re-evaluated. For every evaluated constraint, its optional satisfied/violated action is automatically executed, and a notify event is automatically sent to the user interfaces, with the specified message.

Specifically, the constraints are evaluated in the specified priority order, currently the total ordered set. If any constraint is violated, the last received event is automatically erased from all constraints, since it caused an inconsistency. Furthermore, the violation action is executed, the notify function is executed and the returned notify event is automatically sent to the user interfaces 204 via the service monitor 202. The uplabel function is also executed; if it returns an ancestor's uplabel, it is generated and, hence control reverts back to that ancestor. For example, in FIG. 4, the constraint node 403 for the transfer capability checks whether the source account is an active account of the given customer, i.e., user, via a prescribed constraint. If not, it generates the uplabel "LoginMenu", and control is transferred back to the Login node 401. Then, the user must re-enter his/her login. If no ancestor node's uplabel is returned and a child node is specified, control is transferred to that child node. For example, in FIG. 4, the Login node 401 checks whether the login is of a customer in good standing, via a constraint good_customer, which evaluates goodCustomer(login). If not, control is transferred to the Quit node and the service is terminated. If no ancestor node's uplabel is returned or child node specified for the violated constraint, the node reverts to waiting for events to arrive.

If no constraints have been violated, the action of every satisfied constraint is executed, the associated notify functions are executed and the returned notify events are sent to the user interfaces 204 via the service monitor 202.

When all the constraints have been evaluated and are satisfied, the exit action and notify function associated with the constraint node are executed and the returned notify event is sent to the user interfaces 204 via the service monitor 202. The uplabel function is also executed; if it returns an ancestor node's uplabel, it is generated, and hence control is returned back to the ancestor node. If no ancestor node's uplabel is returned and a child node it specified, control is transferred to that child node.

Action nodes represent some action, not involving user interaction, to be taken. After the action is executed, control transfers to the child node.

Nodes can have an optional "uplabel", which is used to transfer control from some child node back up to the node, allowing the user to revert back to previous points in the service. In each round of interaction, the SISL infrastructure automatically sends out an up event, from the service logic 201 to the user interfaces 204 via the service monitor 202, corresponding to the uplabel of every ancestor of the current node.

Nodes can also have a self-looping arc, with a boolean precondition on data. This indicates that the subgraph from the node will be repeatedly executed until the precondition becomes false.

An example execution of the Any-Time Teller Banking Service is shown in FIG. 4. The service initially causes the statement "Welcome to Any-Time Teller" to be spoken. The control point is at the root node, which is a constraint node. For the constraint of the root node to be satisfied, the login and pin values must be identified, i.e., login==pin, as shown in step 401 of FIG. 4. The SISL infrastructure automatically sends out a prompt_req_login and a prompt_req_pin from the service logic 201 to the user interfaces, via the service monitor 202. The user interfaces, via the prompt function, respond by saying "Please specify your login and personal identification number". For the Web-based user interface, text fields for the login and pin are automatically generated, in known fashion; for the speech recognition-based user interface, the grammars specified in the grammar function are automatically enabled.

In this example, suppose that the user states "My login is Mary Smith and my pin is Mary Smith", and hence a login event with the value "Mary Smith" and a pin event with the value "Mary Smith" are sent to the service logic 201. Since the login and pin are identical, the constraint is satisfied. The SISL infrastructure automatically sends out a notify event with the message "Hello Mary Smith". Welcome to the SISL Any-Time Teller". The user interface makes this statement to the user.

Login Successful

Control now proceeds to step 402 and to the choice node. The SISL infrastructure automatically sends out:

prompt_choice_startDeposit;
prompt_choice_startWithdrawal;
prompt_choice_startTransfer; and
prompt_choice_userQuit;

events from the service logic 201 (FIG. 2) to the user interfaces 204, via the service monitor 202, corresponding to the enabled choices. The user interfaces 204 ask the user "What Transaction would you like to do?" For an automatic speech recognition-based user interface, if the user states "I need help", the user interface states, via a help function, "You can make a withdrawal, deposit transfer or you can quit the service". Consider that the user now chooses to perform a transfer, the startTransfer event is sent to the service logic 201.

Transfer

Control now proceeds to constraint node 406. The SISL infrastructure automatically sends out:

prompt_req_src;
prompt_req_tgt; and
prompt_req_amt events from the service logic 201 to the user interfaces 204, via the service monitor 202, together with a up_MainMenu event, since it is the uplabel of an ancestor node. Assume that the user respond with "I would like to transfer One Thousand Dollars ($1,000.00) from my checking account", or equivalently "From checking, I would like to transfer One Thousand Dollars ($1,000.00)". Either order of the transfer request information is allowed; furthermore, this information in partial, since the target account is not specified. The user interface 204 sends a src event and an amt event, with the corresponding data, to the service monitor 202, which sends them one at a time to the service logic 201. Assume that the src event is sent first, followed by the amt event. The constraints amt>o, isValid(src) and amt<=Balance (src) are automatically evaluated.

Assume that the checking account does not have a balance of at least $1,000.00; hence, there is a constraint violation and the supplied information is erased, since it was sent last.

Note that constraints are evaluated as soon as possible; for example, the user is not required to specify a target account in order for the balance on the source account to be checked. The SISL infrastructure then automatically sends out a prompt_opt_src, prompt_req_tgt, prompt_req_amt and upMainmemu events from the service logic 201 to the user interfaces, via the service monitor 202, as well as, a notify event with the message "Your checking account does not have sufficient funds to cover the amount of $1,000.00. Please specify an amount and a target account." The user interface 204 then notifies the user with this message and prompts the user for the information.

Assume now that the user states "Transfer Five hundred Dollars ($500.00) to savings". The amt and tgt events are sent to the service monitor 202, and passed to the service logic 201. The constraints are now all evaluated and satisfied, the service logic 201 automatically sends a notify event to the user interfaces 204 with the message "Your transfer of $500.00 from checking to savings was successful".

Control then is returned back up to the choice node 402; the loop on the incoming arc to the choice node indicates that the corresponding subgraph is repeatedly executed until the condition on the arc becomes false. If the user wants to quit the service, the userQuit event is sent to the service logic 201, the hasQuit variable is set to true, and the loop is terminated. While in step 402, a loop step 404 is performed to test if the user has terminated, i.e., quit, the session.

Back Up to the Main Menu

If the user would like to abort at any time during a withdrawal, deposit or transfer transaction, he/she can state "I would like to go back up to the Main Menu", which results in an up_MainMenu event to be sent to the service logic 201. This causes control to be returned to the choice node 402, which has an associated upMainMenu label.

Make a Deposit

If a user wishes to make a deposit control proceeds to the deposit constraint node 406. The SISL infrastructure automatically sends out prompt_req_tgt, prompt_req_amt events from the service logic 201 to the user interfaces 204 via service monitor 202. If the target account is valid and the amount is greater than zero (0) the deposit is made and the associated notification is executed.

Make a Withdrawal

If a user wishes to make a withdrawal control proceeds to the deposit constraint node 407. The SISL infrastructure automatically sends out:

prompt_req_src, prompt_req_amt events from the service logic 201 to the user interfaces 204 via service monitor 202. If the source account is valid and the amount is greater than zero (0), it is determined if amt<=Balance(src) and, if so, the withdrawal is made and the associated notification is executed.

FIG. 5 illustrates the steps performed in an example execution of the Any-Time Teller including look ahead in accordance with the invention. The service is started in an INITIAL STATE OF SERVICE. Then, in this example, the following steps are effected:

SERVICE LOGIC 201: sends to Service Monitor 202 a set of enabled events. prompt_req events: {login, pin}.

SERVICE MONITOR 202: sends set of enabled events to User Interfaces 204.

USER INTERFACES 204: prompt the user with "Welcome to the Any-Time Teller banking service. Please specify your login and personal identification number".

USER: states "I want to transfer money from my checking account. My login is JohnDoe and my pin is 4341".

USER INTERFACES 204: send to Service Monitor 202 the set of user events: {startTransfer, src(checking), login(JohnDoe), pin(4341).

MATCHING EVENTS: {login, pin}.

SERVICE MONITOR: sends login(JohnDoe) event to Service Logic.

SERVICE LOGIC 201: sends to Service Monitor 202 set of enabled events. prompt_req events: {pin}, prompt_opt events: {login}.

REMAINING USER EVENTS: {startTransfer, src(checking), pin(4341)}.

MATCHING EVENTS: {pin}.

SERVICE MONITOR 202: send pin(4341) event to Service Logic 201.

SERVICE LOGIC 201: sends to Service Monitor 202 set of enabled events. prompt_choice events: {startDeposit, startWithdrawal, startTransfer, userQuit}.

REMAINING USER EVENTS: {startTransfer, src(checking)}.

MATCHING EVENTS: {startTransfer}.

SERVICE MONITOR 202: sends startTransfer event to Service Logic 201.

SERVICE LOGIC 201: sends to Service monitor 202 set of enabled events. prompt_req events: {src, tgt, amt}.

REMAINING USER EVENTS: {src(checking)}.

MATCHING EVENTS: {src}.

SERVICE MONITOR 202: sends src(checking) event to Service Logic 201.

SERVICE LOGIC 201: sends to Service Monitor 202 a set of enabled events. prompt_req events: {tgt, amt}. prompt_opt events: {src}

SERVICE MONITOR 202: sends set of enabled events to User Interfaces 204.

USER INTERFACES 204: prompt user with "Hello JohnDoe. Please specify the target account and the amount you would like to transfer".

The above-described embodiment is, of course, merely illustrative of the principles of the invention. Indeed, numerous other methods or apparatus may be devised by those skilled in the art without departing from the spirit and scope of the invention.

What is claimed is:

1. Apparatus for use in providing an interactive user service comprising:

a service monitor unit for controlling communication of information between a service logic unit and a plurality of user interfaces, wherein at least one of said user interfaces has natural language understanding, said service monitor unit including a first receiver for receiving information events from any of said plurality of user interfaces, a second receiver for receiving requests for information events from said service logic unit, a correlator for matching received information events to requested information events and for supplying the matched received information events one at a time to said service logic unit in a prescribed order, said service logic unit providing data and logic to said plurality of user interfaces, wherein at least one of said user interfaces has natural language understanding, and facilitating effecting at least one or more of different functions, and said service monitor enabling users of said user interfaces to currently supply information to said service monitor unit in addition to information currently requested by said service logic unit, thereby allowing users to look ahead in the process in which the is users can input information beyond what is currently required by the interactive service.

2. The invention as defined in claim 1 wherein said requested information events are in a set of enabled events.

3. The invention as defined in claim 2 wherein said received information events are in a set of input events, and wherein said correlator matches said received input events to said enabled events.

4. The invention as defined in claim 3 wherein said prescribed order is a prescribed priority order.

5. The invention as defined in claim 4 wherein said priority order is prescribed by the service provider.

6. The invention as defined in claim 4 wherein said service logic unit in response to an input event from said service monitor unit supplies a new set of enabled information events to said service monitor unit.

7. The invention as defined in claim 6 wherein said service monitor unit includes a transmitter for notifying said user interfaces to send a new set of information events.

8. The invention as defined in claim 7 wherein said notification is sent to said user interfaces to send a new set of input events to said service monitor unit only when said correlator indicates that no current input event matches an enabled information event.

9. The invention as defined in claim wherein said service monitor unit includes a transmitter for transmitting said set of enabled information events to said user interfaces.

10. The invention as defined in claim 9 wherein said set of enabled events is sent to said user interfaces from said service monitor unit only when said correlator indicates that no current input event matches an enabled information event.

11. The invention as defined in claim 1 wherein said functions include a set of functions including at least different ordering of inputs from any of said user interfaces, incomplete information from any of said user interfaces, correction of information from any of said user interfaces by enabling a user to change previously provided inputs, returning of control to prior points in said interactive service in response to a request from at least one of said plurality of user interfaces, without having to restart the interactive user service application.

12. The invention as defined in claim 7 further including controlling said transmitter to send said set of enabled events to said user interfaces from said service monitor unit if and only if said step of matching indicates that no current input event matches an enabled event.

13. A method for use in providing an interactive user service comprising steps of:

controlling communication of information through use of a service monitor unit between a service logic unit and a plurality of user interfaces, wherein at least one of said user interfaces has natural language understanding, said step of controlling communication including the steps of receiving information events from any of said plurality of user interfaces, receiving requests for information events from said service logic unit, matching received information events to requested information events, supplying the matched received information events to said service logic unit one at a time in a prescribed order, providing data and logic from said service logic unit to said plurality of user interfaces, wherein at least one of said user interfaces has natural language understanding, and facilitating effecting at least one or more of different functions, and enabling users of said user interfaces to supply information events to said service monitor unit in addition to information events currently requested by said service logic unit, thereby allowing users to look ahead in the process in which the users can input information beyond what is currently required by the interactive service.

14. The method as defined in claim 13 wherein said requested information events are in a set of enabled events.

15. The method as defined in claim 14 wherein said received information events are in a set of input events, and wherein said step of matching includes matching said received input events to said enabled events.

16. The invention as defined in claim 13 wherein said service logic unit in response to an input event from said service monitor unit supplies a new set of enabled events to said service monitor unit.

17. The method as defined in claim 15 wherein said prescribed order is a prescribed priority order.

18. The method as defined in claim 17 wherein said priority order is prescribed by the service provider.

19. The method as defined in claim 17 further including a step of supplying a new set of enabled information events to said service monitor unit from said service logic unit.

20. The method as defined in claim 19 further including a step of notifying said user interfaces to send a new set of information events.

21. The method as defined in claim 20 wherein said step of notifying sends a notification to said user interfaces to send a new set of input events to said service monitor unit only when said step of matching indicates that no current input event matches an enabled information event.

22. The method as defined in claim 19 further including a step of transmitting said set of enabled information events to said user interfaces.

23. The method as defined in claim 22 further including a step of sending said set of enabled information events to said user interfaces from said service monitor unit only when said step of matching indicates that no current input event matches an enabled information event.

24. The invention as defined in claim 13 wherein said functions include a set of functions including at least different ordering of inputs from any of said user interfaces, incomplete information from any of said user interfaces, correction of information from any of said user interfaces by enabling a user to change previously provided inputs, returning of control to prior points in said interactive service in response to a request from at least one of said plurality of user interfaces, without having to restart the interactive user service application.

25. The invention as defined in claim 20 wherein said step of notifying further including controlling said transmitter to send said set of enabled events to said user interfaces from said service monitor unit if and only if said step of matching indicates that no current input event matches an enabled event.

26. Apparatus for use in providing an interactive user service comprising:

means for controlling communication of information through a service monitor unit between a service logic unit and a plurality of user interfaces, wherein at least one of said user interfaces has natural language understanding, said means for controlling communication including first means for receiving information events from any of said plurality of user interfaces, second means for receiving requests for information events from said service logic unit, means for matching received information events to requested information, first means for supplying the matched received information events to said service logic unit one at a time in a prescribed order, means for providing data and logic from said service logic unit to said plurality of user interfaces, wherein at least one of said user interfaces has natural language understanding, and facilitating effecting at least one or more of different functions, and means for enabling users of said user interfaces to supply information events to said service monitor unit in addition to information events currently requested by said service logic unit, thereby allowing users to look ahead in the process in which the users can input information beyond what is currently required by the interactive service.

27. The invention as defined in claim 26 wherein said requested information events are in a set of enabled events.

28. The invention as defined in claim 27 wherein said received information events are in a set of input events, and wherein said means for matching matches said received input events to said enabled events.

29. The invention as defined in claim 28 wherein said prescribed order is a prescribed priority order.

30. The invention as defined in claim 28 further including second means for supplying a new set of enabled information events to said service monitor unit from said service logic unit.

31. The invention as defined in claim 30 further including means for notifying said user interfaces to send a new set of information events.

32. The invention as defined in claim 31 wherein said means for notifying sends a notification to said user interfaces to send a new set of input events to said service monitor unit only when said means for matching indicates that no current input event matches an enabled information event.

33. The invention as defined in claim 30 further including means for transmitting said set of enabled information events from said service monitor unit to said user interfaces.

34. The invention as defined in claim 33 further including means for sending said set of enabled information events to said user interfaces from said service monitor unit only when said step of matching indicates that no current input event matches an enabled event.

35. The invention as defined in claim 26 wherein said functions include a set of functions including at least different ordering of inputs from any of said user interfaces, incomplete information from any of said user interfaces, correction of information from any of said user interfaces by enabling a user to change previously provided inputs, returning of control to prior points in said interactive service in response to a request from at least one of said plurality of user interfaces, without having to restart the interactive user service application.

36. The invention as defined in claim 31 wherein said means for notifying further includes means for controlling sending said set of enabled events to said user interfaces from said service monitor unit if and only if said step of matching indicates that no current input event matches an enabled event.

* * * * *